United States Patent
Gosling et al.

(10) Patent No.: US 9,307,701 B2
(45) Date of Patent: Apr. 12, 2016

(54) MODULAR WALLS WITH INCORPORATED PLANTERS

(75) Inventors: Geoff Gosling, Calgary (CA); Mogens F. Smed, DeWinton (CA)

(73) Assignee: DIRTT Environmental Solutions, LTD, Calgary, CA (US)

(*) Notice: Subject to any disclaimer, the term of this patent is extended or adjusted under 35 U.S.C. 154(b) by 0 days.

(21) Appl. No.: 13/515,944

(22) PCT Filed: Mar. 23, 2012

(86) PCT No.: PCT/US2012/030421
§ 371 (c)(1),
(2), (4) Date: Jun. 14, 2012

(87) PCT Pub. No.: WO2012/129522
PCT Pub. Date: Sep. 27, 2012

(65) Prior Publication Data
US 2014/0075840 A1    Mar. 20, 2014

Related U.S. Application Data

(60) Provisional application No. 61/467,053, filed on Mar. 24, 2011.

(51) Int. Cl.
*A01G 9/02* (2006.01)
*A01G 27/04* (2006.01)

(52) U.S. Cl.
CPC *A01G 9/02* (2013.01); *A01G 9/025* (2013.01); *A01G 27/04* (2013.01); *Y02P 60/244* (2015.11)

(58) Field of Classification Search
CPC ............ A01G 9/02; A01G 9/022–9/025; A01G 9/027; A01G 9/042; A01G 9/104; A01G 9/12; A01G 25/12; A01G 27/005; A01G 27/04; A01G 27/06
USPC ............ 47/65.5, 66.1, 66.5, 66.6, 67, 68, 79, 47/81, 82, 83, 86, 87, 39, 40, 44, 45, 47, 47/48.5
IPC ............... A01G 9/02, 9/12, 25/02, 27/04, 27/06
See application file for complete search history.

(56) References Cited

U.S. PATENT DOCUMENTS 2,279,735 A * 4/1942 Gates ................................ 47/33
3,047,158 A * 7/1962 Scholl ......................... 211/85.17
(Continued)

FOREIGN PATENT DOCUMENTS

EP    0393735    10/1990
FR    2902283    12/2007
(Continued)

OTHER PUBLICATIONS

International Search Report and Opinion for PCT/US12/30421 mailed Oct. 31, 2012.
(Continued)

*Primary Examiner* — Lisa Tsang
(74) *Attorney, Agent, or Firm* — Workman Nydegger (57) ABSTRACT

Implementations of the present invention relate to systems and apparatus for incorporating live plants on support surfaces, such as walls, wall segments, and wall modules inside of a building. Such systems and apparatus can provide pleasing aesthetic and an improved environment for occupant of a space within the building. The modular living wall system also can reduce or eliminate the need for manual watering of the live plants.

9 Claims, 5 Drawing Sheets

(56) References Cited

U.S. PATENT DOCUMENTS

| | | | |
|---|---|---|---|
| 4,255,896 A | | 3/1981 | Carl |
| 4,295,296 A | | 10/1981 | Killhorn |
| 6,003,824 A | * | 12/1999 | Peterson et al. ............ 248/312.1 |
| 6,634,138 B2 | * | 10/2003 | Katzman ................. B05B 17/08 239/12 |
| 7,080,482 B1 | | 7/2006 | Bradley |
| 8,250,804 B2 | * | 8/2012 | Chang ................. 47/39 |
| 8,646,205 B2 | * | 2/2014 | Cho ................ 47/66.6 |
| 8,683,744 B2 | * | 4/2014 | Chang ................. 47/81 |
| 2008/0000153 A1 | | 1/2008 | Sugiyama |
| 2009/0183427 A1 | * | 7/2009 | DiMaggio .............. A47G 7/041 47/39 |
| 2009/0223126 A1 | | 9/2009 | Garner |
| 2010/0095584 A1 | | 4/2010 | Huet |
| 2010/0146855 A1 | | 6/2010 | Ma |
| 2011/0192084 A1 | * | 8/2011 | MacKenzie ....................... 47/83 |
| 2011/0258925 A1 | * | 10/2011 | Baker ........................... 47/65.8 |
| 2013/0025196 A1 | * | 1/2013 | Decker .................. A47G 7/044 47/39 |
| 2014/0109473 A1 | * | 4/2014 | Sung ................................ 47/39 |

FOREIGN PATENT DOCUMENTS

| | | |
|---|---|---|
| JP | 2006253684 | 9/1994 |
| JP | 2004248533 | 9/2004 |
| KR | 20040017555 | 2/2004 |
| WO | WO2010142000 | 12/2010 |
| WO | WO2011014124 | 2/2011 |

OTHER PUBLICATIONS

Canadian office action for 2,780,360 mailed on Apr. 16, 2013.
Preliminary Report on Patentability for PCT/US2012/030421 mailed Oct. 3, 2013.
European Search Report for PCT/US2012/030421, Mailed Jul. 28, 2014.

* cited by examiner

MODULAR WALLS WITH INCORPORATED PLANTERS

CROSS-REFERENCE TO RELATED APPLICATIONS

The present application is a U.S. National Stage of PCT Application No. PCT/US12/30421, filed on Mar. 23, 2012, which claims the benefit of and priority to U.S. Provisional Patent Application No. 61/467,053, filed Mar. 24, 2011, entitled "Modular Living Walls." The entire content of each of the aforementioned patent applications is incorporated by reference herein.

BACKGROUND OF THE INVENTION

1. The Field of the Invention

This invention relates to systems, methods, and apparatus for adding live plants to a wall inside of a building. More specifically, the systems, methods, and apparatus relate to incorporating live plants into a wall module.

2. Background and Relevant Art

Office workers often spend approximately eight hours a day or more working in an office or cubical. Such workspaces can be dull and aesthetically unpleasing, and lead to reduced production. It is known that adding plants to a workspace can increase the attractiveness of the workspace.

In addition to the foregoing, high levels of pollutants common in building interiors can contribute to illness and lower rates of productivity in the workplace. To address toxic elements circulating in the air and render it fit for human use, most buildings condition air through a heating, ventilation and air conditioning (HVAC) system. Conditioning air requires energy, further contributing to greenhouse gas production and the cost of building operations. Plant landscapes are known to remove harmful environmental toxins found in building interiors, and can lighten the load of the HVAC system by removing many of these pollutants, resulting in less energy use in buildings.

Unfortunately, the addition of live plants to a workspace can present a number of drawbacks. For example, typical live plants require regular watering. Hence, care and regular watering of such plants may result in interruptions to the worker, which may be unexpected and/or unwanted. Additionally, common plant watering practices may lead to spills and mess that can produce hazardous environment as well as unpleasant appearance of the individual space. The challenges and problems relevant to a single live plant may drastically increase with the number of live plants that may require attention and care.

Living walls (walls which incorporate live plants within or attached to the wall with a mechanism to provide water to such plants) are typically vertical living plant systems that are typically fixed in place. The behavior of modular and adaptive wall systems has historically been in conflict with the core nature of these living wall systems. Furthermore, in the event occupants wish to reconfigure their individual offices, conventional living walls may present an obstacle to such rearrangement as conventional living walls are immutable.

Accordingly, there are a number of disadvantages in conventional systems that incorporate live plants into the wall modules that can be addressed.

BRIEF SUMMARY OF THE INVENTION

Implementations of the present invention provide systems and apparatus for incorporating live plants on support surfaces, such as walls, wall segments, and wall modules inside a building. Such system can provide pleasing aesthetic and improved surroundings for an occupant of an individual space within the building. Moreover, the system also can help to reduce volatile organic compounds (i.e., various pollutants) that may be present in the air of building, thereby providing a healthier environment for the occupants. In one or more implementations, the system and apparatus also can include a watering system, which can optimize water delivery to the live plants.

At least one implementation includes a wall module incorporating live plants. The wall module is configured to selectively attach to one or more additional wall modules to form a reconfigurable partition to divide an interior space. Such wall module includes one or more upright supports configured to couple the wall module to another wall module and one or more cross-members secured to the one or more upright supports. The wall module also includes a panel configured to be coupled to one or more of the upright supports and the cross-members and one or more planters secured to the panel. The one or more planters are sized and configured to contain one or more live plants. Furthermore, the wall module includes a watering system configured to supply water to the one or more planters.

One or more implementations include a reconfigurable modular wall system incorporating one or more live plants. The reconfigurable modular wall system is configured to divide an interior space and is also configured to be easily assembled, reconfigured, and disassembled. Such reconfigurable modular wall system includes a plurality of wall modules selectively secured together to form a partition and one or more planters configured to contain live plants. The planters are configured to be selectively coupled to a wall module of the plurality of wall modules at any of a plurality of available locations on the wall module. Additionally, the reconfigurable modular wall system includes a first watering tray selectively mounted on the wall module, wherein the first watering tray is mounted below the one or more planters and a water delivery system configured to deliver water from the first watering tray to the one or more planters. Furthermore, a water supply system is connected to the first watering tray and is configured to supply water into the first watering tray.

At least one other implementation includes an indoor live plant system configured to be mounted on a support surface and to supply water to live plants. Such system includes a panel and one or more planters configured to contain live plants, the one or more planters coupled to the panel. The system also includes a first watering tray coupled to the panel and a second watering tray coupled to the panel, wherein the second watering tray is coupled to the panel below the first watering tray. Moreover, the system includes a connection pipe interconnecting the first watering tray and the second watering tray and configured to provide communication of water between the first and the second watering trays. The system also includes a supply pipe connected to the first watering tray and configured to supply water into the first watering tray.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention provide systems and apparatus for incorporating live plants on support surfaces, such as walls, wall segments, and wall modules inside a building. Such system can provide pleasing aesthetic and improved surroundings for an occupant of an individual space within the building. Moreover, the system also can help to reduce volatile organic compounds (i.e., various pollutants) that may be present in the air of building, thereby providing a healthier environment for the occupants. In one or more implementations, the system and apparatus also can include a watering system, which can optimize water delivery to the live plants.

In particular, one or more implementations include one or more container components to hold one or more plants, and one or more watering components to provide water to the plants. The container and watering components can attach to a modular wall. In at least one implementation, the watering components include one or more trays or troughs to act as reservoirs for supplying water to the container components. A user or designer can adapt the modular live plant system by adding, subtracting, or realigning the components on a modular wall, or by moving the components to another modular wall.

In alternative or additional implementations, a modular live plant system or modular living wall incorporates the container and watering components within the panels of a modular wall system rather than as separate components that attach to the panels. In these implementations, the panels can interconnect in various configurations within the environment of the modular live plant system.

As a preliminary matter, frequent reference is made herein to modular walls or wall modules. A modular wall is intended to mean any wall that facilitates the reconfiguration of attachments such as the container and watering components of the present invention. A modular wall may comprise a special purpose wall that is specifically configured to receive attachments of a particular configuration. A modular wall, however, may be a standard flat wall that is rendered modular by the fact that the attachments are configured to be mounted (and remounted) to the wall in a non-permanent manner such as to enable the reconfiguration (e.g. addition, removal, movement to another position) of the attachments. Accordingly, the present invention applies to many different types of modular walls and is not limited to any particular modular wall such as those shown in the Figures.

In at least one implementation, the indoor live plant system can allow the occupants of the building to secure live plants to one or more walls within the building. In particular, the indoor live plant system can provide occupants with ability to create various arrangements and configurations of one or more planters and, consequently, of the live plants within the planters on one or more walls in the building. Furthermore, the indoor live plant system can include a watering system that can supply water to the live plants at various positions and in various arrangements on the wall. Accordingly, the indoor live plant system can sustain live plants, which may have substantially any desired positions and/or arrangement.

Additionally or alternatively, the planters of the indoor live plant system can incorporate one or more mounting elements (e.g., protrusions/protruding elements, recessed elements, etc.) that may allow an installer to reposition the planters. In particular, the planters can include one or more mounting elements that can connect to a panel, and which can allow the installer to easily remove and/or reposition one or more planters on the walls or wall module. For example, the panel may remain stationary on the wall, and the installer can reposition and/or rearrange the planters with respect to the stationary panel.

Figure 1:
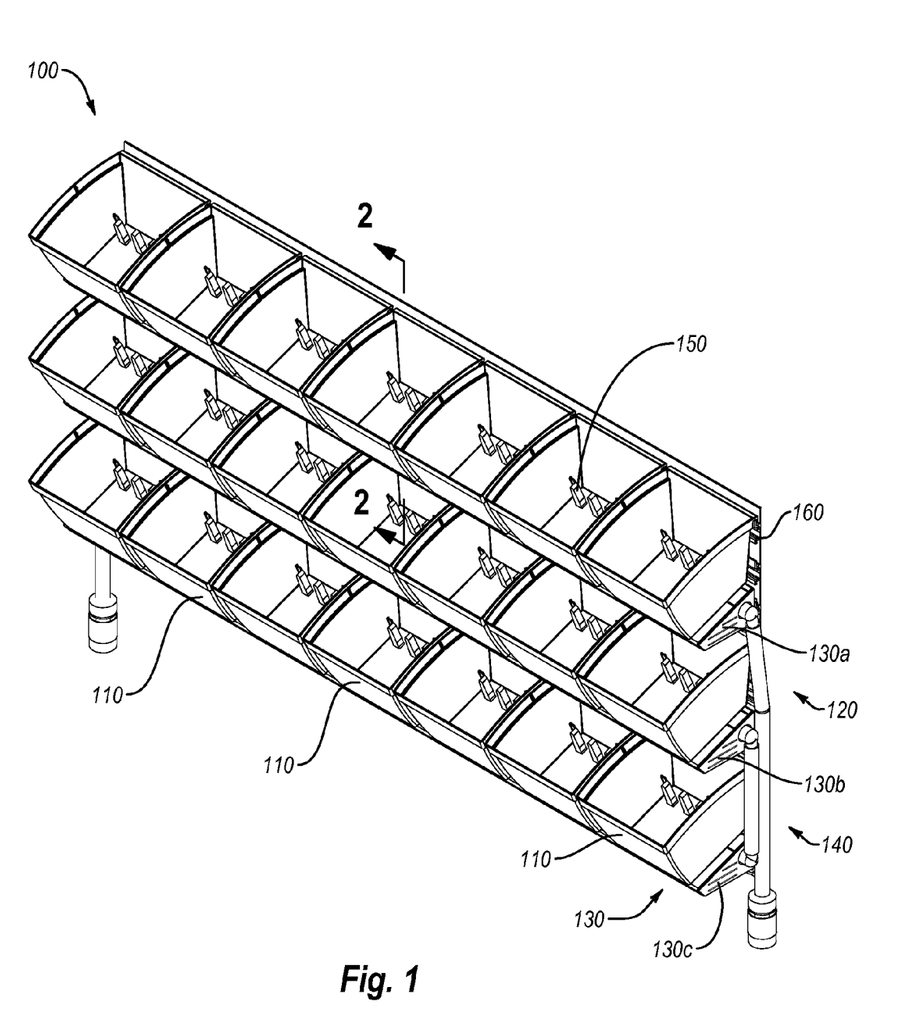
FIG. 1 illustrates a perspective view of an indoor live plant system in accordance with one implementation of the present invention.

In one or more implementations, the indoor live plant system also can include a single planter or multiple planters, each of which may house one or more live plants, and which may cover all or a portion of a particular wall or wall module. For instance, as illustrated in FIG. 1, an indoor live plant system 100 can include one or more container components configured to house a live plant, such as planters 110. The indoor live plant system 100 can also include a watering system 120. The watering system 120 can deliver water to the planters 110, thereby supplying water to the live plants that may be contained within the planters 110. The indoor live plant system 100 can further include a panel 160. The panel 160 can support the planters 110 and the watering system 120. As explained in greater detail below, the panel 160 can attach to a wall, a support surface, a modular wall panel, or comprise a modular wall panel.

The watering system 120 can include one or more watering components, such as watering trays 130 (e.g., watering trays 130a, 130b, 130c, etc.). The watering trays 130 can contain and/or channel the water delivered from a water source. The term "water," as used herein, refers to any substance in liquid or semi-liquid from (e.g., gel), which may support life of the live plants, and which includes but is not limited to water, water-based solutions, fertilizer, etc. The watering system 120 also can include one or more hoses or connection pipes 140, which can deliver the water to and from the watering trays 130. Furthermore, in at least one implementation, the watering system 120 can include a water delivery system 150 that can deliver the water from the watering trays 130 into one or more planters 110.

In one or more implementations, the watering system 120 can receive water from a water supply system (e.g., plumbing system within the building). Moreover, the watering system 120 can incorporate a controller, which can activate the water supply system, thereby supplying water into the watering system 120 at predetermined time intervals. Additionally or alternatively, the occupant of the building can manually add water to the watering system 120. Whether added manually or in an automated fashion, the water can enter the watering system 120 at a single point and can subsequently flow into the various watering trays 130 comprising the watering system 120. In other words, the watering system 120 can distribute the water from a single fill point, where the water can enter one or more of the watering trays 130, such that the desired watering trays 130 as well as planters 110 within the indoor live plant system 100 can receive water.

In at least one implementation, one or more portions of the watering system 120, such as the watering trays 130, are located below the planters 110. For example, the watering tray 130*a* can couple to the support surface below a first row of one or more planters 110. Accordingly, the water delivery system 150 can deliver water upward from the watering trays 130 into the planters 110. In particular, the water delivery system 150 can include a wick, which can absorb water present in the watering trays 130 (e.g., by capillary action) and deliver the water into the planters 110.

Additionally or alternatively, one or more portion of the watering system 120 can couple to the support surface above one or more planters 110. For instance, the watering trays 130 can include one or more perforations that may allow water to flow or drip down into one or more planters 110. Furthermore, the watering trays 130 also can include a sponge-like material covering the perforations. Accordingly, the sponge-like material may absorb the water that enters the watering trays 130 and may permit only a regulated amount of water to pass through the perforations in the watering trays 130.

Figure 2:
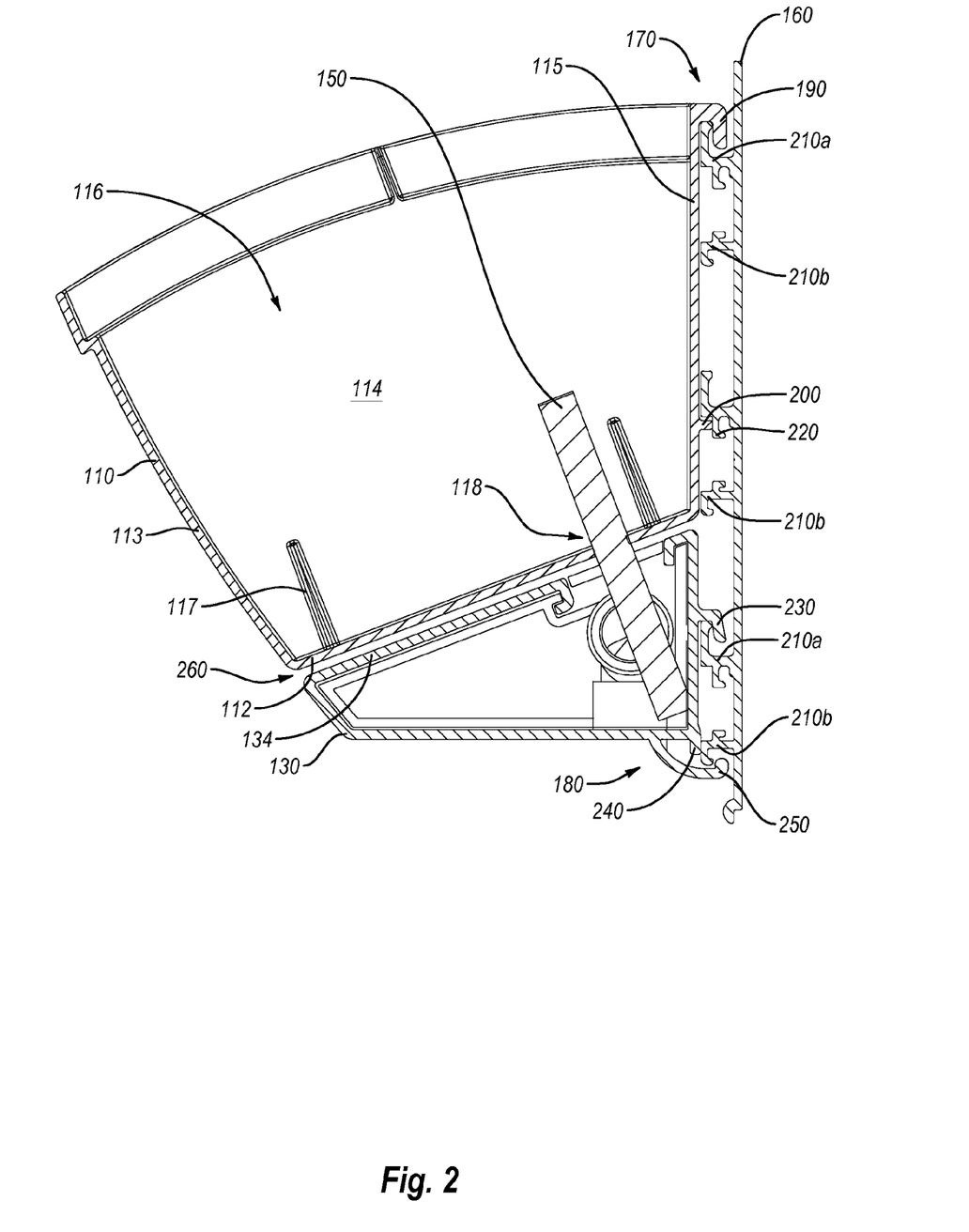
FIG. 2 illustrates a cross-sectional view of the indoor live plant system of FIG. 1 taken along the line 2-2 of FIG. 1.

Referring now to FIG. 2 various components and features of the planters 110, watering trays 130, and panel 160 are shown and described in greater detail. For example, FIG. 2 illustrates that the panel 160 comprise one or more mounting channels 210*a*, 210*b*. The mounting channels 210*a* can comprise L-shaped bodies that extend laterally away from the panel 160 and longitudinally upward as shown in FIG. 2.

Similar to the mounting channels 210*a*, the mounting channels 210*b* can comprise L-shaped bodies. In particular, the mounting channels 210*b* can extend laterally away from the panel 160 and generally longitudinally downward. In addition to the mounting channels 210*a*, 210*b*, the panel 160 can further include one or more standoffs. As shown by FIG. 2, the standoff 220 can comprise a ridge that extending from the bottom of a mounting channel 210*a* generally downward. The mounting channels 210*a*, 210*b* and the standoffs 220 can corporate with corresponding features to couple the planters 110 and the watering system 140 to the panel 160.

As shown by FIG. 2, the planter 110 can comprise a bottom surface 112 bounded by a front wall 113, opposing side walls 114, and a rear wall 115. The walls 113, 114, 115 of the planter 110 can define an interior space 116 for receiving one or more live plants and/or a potting medium. The planters 110 can have numerous external and internal shapes and dimensions, as desired by the installer or suitable for a particular building environment. More specifically, the planters 110 can have a substantially rectangular outside shape as shown by FIG. 2. In alternative implementations, the planters 110 can comprise square, circular, oval, or complex shapes depending upon a desired aesthetic.

In any event, in one or more implementations the rear surface 115 of the planter 110 can be oriented at an obtuse angle relative to the bottom surface 112 as shown in FIG. 2. Thus, when mounted on a substantially vertical support surface, a bottom surface 112 of the planters 110 may form an acute angle with the support surface. Thus, the planters 110 can present a greater portion of the live plants to a viewer of the indoor live plant system 100.

Additionally, the planters 110 can have at least one curved wall, which may create a pleasing aesthetic for the viewer. For example, a front wall 113 of one or more planters 110 can have a curved surface. Thus, the installer or occupant can arrange the planters 110 on the support surface or the panel 160 to form various shapes (e.g., the planters 110 can form a wave-like shape).

In addition to the foregoing, FIG. 2 illustrates that the front wall 113 has approximately the same size as the bottom surface 112 and the rear wall 115. In alternative implementations, the front wall 113 can have a low-profile or otherwise be smaller (or shorter) than the bottom surface 112 and the rear wall 115. A low-profile front wall 113 can allow greater visibility of any plants inside the planter 110 or otherwise allow such plants to conceal the planter 110 to a great extent.

The planter 110 can optionally include one or more pegs 117. The pegs 117 can comprise supports extending from the bottom surface 112 generally upward into the interior space 116 of the planter 110. The pegs 117 can provide support to a live plant. FIG. 2 further illustrates that the planter 110 can include one or more holes 118 extending through the bottom surface 112. The holes 118 can allow a water delivery system 150 to transport or otherwise provide water to plants in the planter 110 as explained in greater detail below.

As described in greater detail below, the planter 110 can include one or more features or components that allow for selective connection to the panel 160. The ability to removably connect the planter 110 to the wall 160 can allow a user the ability to easily move, remove, and/or reconfigure the design of a live plant system 100. One will appreciate that a user may desire to move or reconfigure the live plant system 100 to change the aesthetic of the live plant system 100 or to compensate for reconfiguration of a wall, room, office, or cubical to which the live plant system 100 is mounted.

For example, the planter 110 can include mounting elements 170 for selectively securing the planter 110 to the panel 160. As shown by FIG. 2, the mounting elements 170 can include one or more mounting hooks 190 and one or more stays 200. The mounting hooks 190 can support the planter 110 in a hanging position on the panel 160 (or on a support surface) that contains a channel that can accept the mounting hooks 190. The mounting hooks 190 can comprise L-shaped bodies. In particular, the mounting hooks 190 can extend laterally away from the planter 110 and longitudinally downward. Thus, as shown by FIG. 2, the mounting hook 190 can connect to the mounting channel 210*a* to hold and support the planter 110 on the panel 160.

The mounting elements 170 of the planter 110 can optionally include one or more stays 200. The stays 200 can comprise protrusions that extend generally perpendicularly away from the back wall of the planter 110. The stays 200 can cooperate with the panel 160 to provide separation between the panel 160 and the planters 110 and/or provide a desired orientation of the planter 110 relative to the panel 160 as explained in greater detail below. The stays 200 of the planters 110 can abut the standoffs 220 of the panel 160 to create a separation between the planters 110 and a portion of the panel 160 and/or dictate the angle at which the planter 110 is oriented relative to the panel 160.

More specifically, the stays 200 of the planters 110 and the standoffs 220 can cooperate to determine the angle of the planters 110. In other words, location of an interface between the stays 200 and the standoffs 220 can set the angle formed between the back wall of the planters 110 with respect and the support surface. Thus, for example, incorporating various planters 110 that have differently sized stays 200 can create the indoor live plant system 100 with planters 110 disposed at different angles, which may produce a further appealing aesthetic.

Similar to the planter(s) 110, the watering trays 130 can also removably couple to the panel 160. In particular, the watering trays 130 can incorporate mounting elements 180, such as one or more mounting hooks 230, one or more stays 240, and/or one or more snaps 250. The mounting hooks 230 can comprise L-shaped bodies. In particular, the mounting hooks 230 can extend laterally away from a back wall of the watering tray 130 and longitudinally downward. Thus, as shown by FIG. 2, the mounting hooks 230 can connect to the mounting channel 210a to hold and support the watering tray 130 on the panel 160.

Additionally, the watering tray 130 can have one or more stays 240. The stays 240 can comprise protrusions that extend laterally away and/or longitudinally downward from the back surface of the watering tray 130. The stays 240 can abut the outer surface of the mounting channel 210b to provide additional stability to the watering trays 130. Location of an interface between the stays 240 and the mounting channel 210b can help define the angle formed by a back wall of the watering trays 130 and the panel 160. Accordingly, the angle of the watering trays 130 can vary based on the location of the interface between the stays 240 and mounting channel 210b.

In at least one implementation, the watering trays 130 also can include one or more snaps 250 that can fit into the mounting channels 210b. The snaps 250 can comprise a flexible arm extending from either the bottom surface or back wall of the watering tray 130. The snaps 250 can deform about and into the mounting channels 210b. Additionally or alternatively, the snaps 250 (as well as other mounting elements described above) can slide into the mounting channels 210b. Furthermore, the snaps 250 can force the stays 240 against the mounting channels 210b. In particular, the stays 240, the snaps 250, and/or the standoffs 220b may comprise of flexible, resilient material that may have spring-like properties.

Thus, when the stays 240 presses against the standoffs 220b, the stays 240 and/or standoffs 220b can deflect and remain in contact one with the other, which may provide additionally stability to the watering trays 130. Such stability may have particular advantage when the water enters and/or flows within the watering trays 130. Accordingly, the stays 240, snaps 250, and standoffs 220b can cooperate to prevent shifting or undesirable movement of the watering trays 130, thereby potentially preventing spills or other incidents that may result from undesirable movements of the watering trays 130.

As described above, the panel 160 can have various features that can allow the installer to selectively and removably secure the planters 110 and at least a part of the watering system 120 to the panel 160. For example, the panel 160 can have channels 210 that can accept mounting elements 170, 180 of the planters 110 and watering trays 130. Alternatively, panel 160 can have no mounting features, and the planters 110 and/or watering system 120 can mount directly to such panel with screws or other fasteners. It should also be noted that panel 160 can have various configurations, designs, and styles (e.g., material, color, thickness, size, shape, etc.). Accordingly, the installer can assemble the wall module incorporating live plants 370 based on the particular requirements or desires of the occupant, using one or more appropriate panels 160.

In one or more implementations, as described above, the watering trays 130 can couple to the support surface and/or to the panel 160 below the planters 110. Furthermore, the indoor live plant system 100 can incorporate a space 260, which can separate the bottom wall of the planters 110 from a top wall of the watering trays 130. Incorporating the space 260 into the indoor live plant system 100 (between the planters 110 and the watering trays 130) also can allow a manufacturer of the planters 110 and/or watering trays 130 to relax production tolerances thereof. In other words, the space 260 can provide clearance between the planters 110 and watering trays 130 that can accommodate manufacturing dimensional deviations and facilitate installation of the indoor live plant system 100.

The watering trays 130 can include one or more sidewalls that forms a substantially normal, acute, or obtuse angle with a bottom wall thereof. In at least one implementation, the sidewall of the watering trays 130 that incorporates mounting elements 180 can form a normal or an acute angle with the bottom wall of the watering trays 130. Thus, for example, the water contained within the watering trays 130 can remain proximate to an intake position of the water delivery system 150.

Additionally, as described above, a sidewall of the planters 110 can form an angle (e.g., 90°, acute, or obtuse) with respect to the bottom surface thereof; hence, the planters 110 can form, for example, an acute angle between the bottom surface 112 thereof and the support surface and/or panel 160. Accordingly, in one or more implementations, the bottom surface 110 of the planters 110 and the bottom wall of the watering trays 130 can form an acute angle with respect to each other. Alternatively, the bottom walls of the planters 110 and watering trays 130 can form an obtuse angle or can be parallel with respect to one another.

The watering trays 130 also can have the top wall 134 that forms an acute angle with respect to the bottom wall 132 of the watering trays 130. Thus, the top wall 134 of the watering trays 130 and the bottom surface 112 of the planters 110 can be substantially parallel with one another. Hence, the space 260 between the planters 110 and the watering trays 130 can be approximately the same throughout the indoor live plant system 100, which can enhance the aesthetic of the indoor live plant system 100. Additionally, the shape or curvature of a front-facing surface (or a front wall) 135 of the watering tray 130 can match the shape and/or curvature of the front wall of the planters 110 disposed above and/or below such watering tray 130.

As described above, the watering system 120 can incorporate a water delivery system 150. In particular, the planters 110 can include an opening or hole 118 in the bottom surface 112 that can provide the water delivery system 150 with access to the interior space 116 of the planter 110. The water delivery system 150 can channel water from the watering trays 130 into the planters 110. For example, the opening or hole 118 in the bottom surface of the planters 110 can accept the water delivery system 150. Additionally, the watering system 120 can include water delivery system 150 that has a location proximate to the sidewall of the watering trays 130, which incorporates the mounting elements 180.

In at least one implementation, the opening or hole 118 in the bottom surface 112 of the planter 110 and at least a portion of the water delivery system 150 can cooperate to prevent any contents of the planters 110 from exiting through the hole 118 in the bottom surface 112 of the planter 110. For example, in addition to live plants, the planters 110 can include potting medium, such as soil or soilless medium designed for cultivation of horticultural plants. Thus, the planters 110 can have clearance between the hole 118 in the bottom surface 112 and the water delivery system 150 that is smaller than the particles of the potting medium. Furthermore, the water delivery system 150 also can have an interference fit with the hole 118 in the bottom surface 112 of the planters 110, thereby preventing the potting medium from exiting the planters 110.

Moreover, such interference fit (as well as other methods of sealing the water delivery system 150 within the hole 118 in the bottom surface 112 of the planters 110) also can secure the water delivery system 150 to the planters 110. Accordingly, the installer or occupant can remove the planters 110 from the support surface and/or panel 160 together with the water delivery system 150. Maintaining the water delivery system 150 secured to the planters 110 while the planters 110 are disconnected from the support surface and/or panel 160 also can help maintain the potting medium within the planters 110. More specifically, such configuration can help maintain the potting medium within the planters 110 while the occupant relocates, repositions, and/or rearranges various planters 110.

The top wall 134 of the watering trays 130 also can include an opening therein, which can provide access to the water delivery system 150 that can deliver water from the watering trays 130 into the planters 110. In particular, the top wall 134 of the watering trays 130 can accommodate the water delivery system 150.

In one or more implementations, the water delivery system 150 can comprise a wick. The wick 150 can comprise a cellulose sponge material or other porous formed materials. For example, the wick 150 can comprise formed resin composites, sponge materials, cellulose materials, or fibrous materials. In any event, when in contact with water in the watering tray 130, the wick 150 can transport water by absorption and/or capillary action from the watering tray 130 along its length and into the planter 110. Soil or other growing medium in the planter can diffuse the water into the plant root.

One will appreciate that the water delivery system (e.g., wick 150) can allow the watering tray 130 and planter 110 to be separated. This can prevent direct contact between the planter 110 (and the associated plant and soil therein) and the water. Thus, the wick 150 can help prevent the planting medium from absorbing excess water, with adverse consequences for the respective plant.

FIGS. 1-2 illustrate that the length of each watering tray 130 corresponds with the length of a planter 110. One will appreciate that the present invention is not so limited. In additional implementations, a single watering tray 130 can supply water for two, three, four, or more planters 110. Thus, the length of a given watering tray 130 can be equal to, double, triple, etc. the length of a given planter 110. Alternatively, the length of a given planter 110 can be equal to, double, triple, etc. the length of a given watering tray 130. Thus, multiple watering trays 130 can supply a single planter 110.

The planters 110 and/or the watering trays 130 can comprise a substantially rigid material, such as thermoplastic, metal, wood, etc., suitable to secure and contain live plants. Additionally or alternatively, the planters 110 and/or the watering trays 130 can have at least partially water-proof construction, which may allow the planters 110 to contain water. Accordingly, the watering system 120 can deliver water into the planters 110, and the water may remain within the planters 110 (e.g., until absorbed by the live plants or evaporated). Similarly, the water can remain within the watering trays 130 without spilling.

Figure 3:
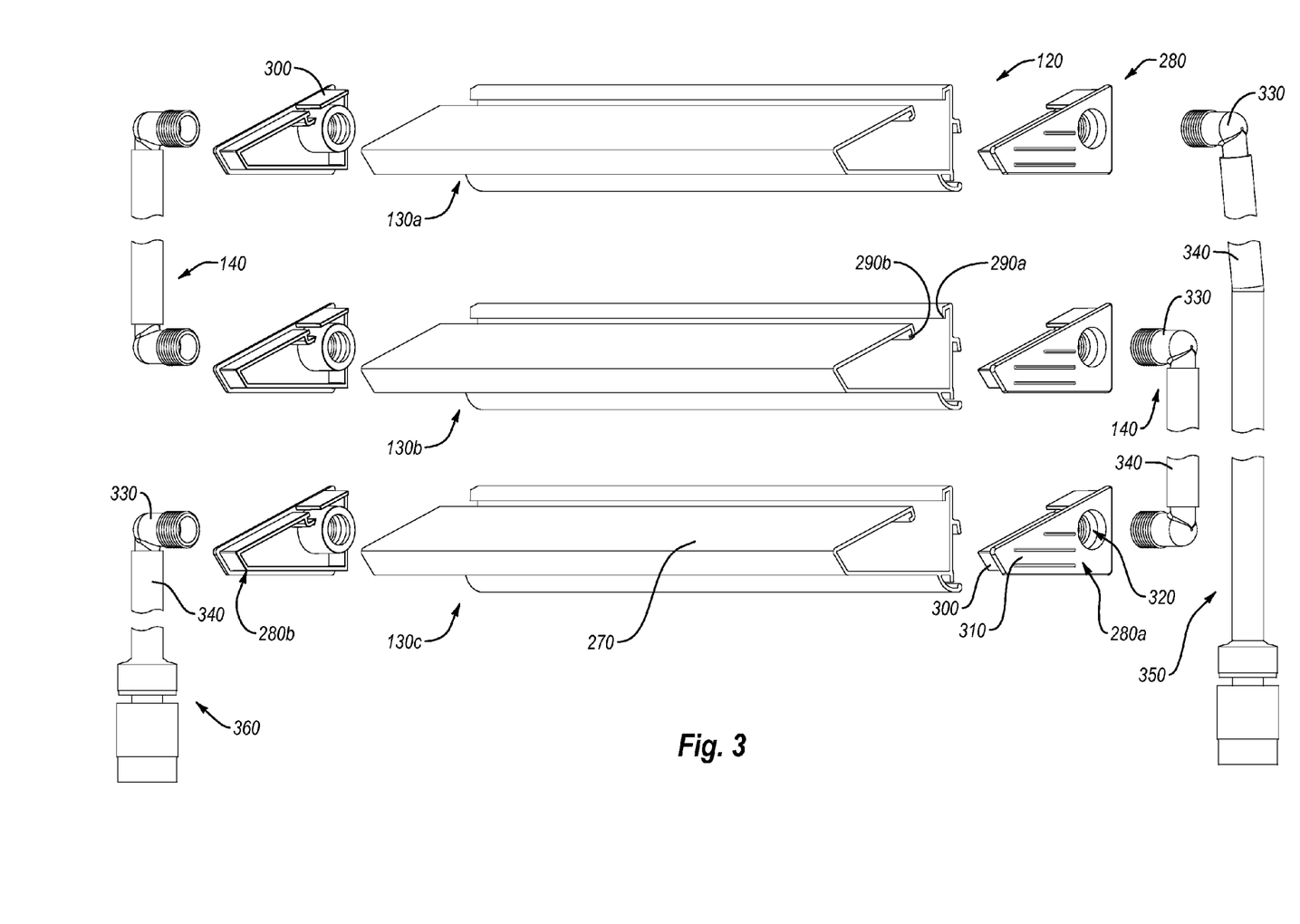
FIG. 3 illustrates a perspective exploded view of a watering system in accordance with one implementation of the present invention.

Referring now to FIG. 3, further details of the watering system are shown and described. For instance, as illustrated in FIG. 3, the watering trays 130 can include a tray body 270 (formed by walls 132, 134, 135) and one or more end caps 280 (e.g., end caps 280*a*, 280*b*). The end caps 280 can couple to the tray body 270 and can, thereby, create a sealed enclosure that can channel and/or contain water.

The tray body 270 can incorporate the mounting elements 180, as described above. Furthermore, the tray body 270 can include end folds 290 (e.g., end folds 290*a*, 290*b*). In particular, the end folds 290 can mate with corresponding portions of the end caps 280, thereby securing the end caps 280 to the tray body 270. For example, the tray body 270 can comprise an extruded section (e.g., a thermoplastic extrusion), which can incorporate the end folds 290 at each end. In at least one implementation, the end folds 290 can extend throughout an entire length of the tray body 270.

The end caps 280 can include a rib 300 and a face plate 310 secured to or integrated with the rib 300. In at least one implementation, the rib 300 can have a shape that is substantially the same as the shape of an internal perimeter of the tray body 270. In other words, the rib 300 can have substantially the same shape as the shape formed by the walls 132, 134, 135 of the tray body 270 and/or by the end folds 290. Additionally or alternatively, the rib 300 can fit inside of the perimeter formed by the walls of the tray body 270 and by the end folds 290, and can couple thereto.

Hence, for instance, the installer can build the watering trays 130 on the site of the installation, rather than obtain pre-manufactured, fully assembled watering trays 130. For example, the installer can cut the tray body 270 to a desired length (based on the planters 110, the support surface, panel 160, and/or occupant's preference). Subsequently, the installer can secure the end caps 280 to the tray bodies 270, thereby forming the watering trays 130. The installer also can secure the end caps 280 to the tray body 270 using any number of available techniques, such as adhesives, press fitting, ultrasonic welding, etc.

In one or more implementations, the end caps 280 can include openings 300. Accordingly, the connection pipes 140 can couple to the end caps 280, such that the water can flow from the connection pipes 140, through the openings 320, and into the watering trays 130. For example, the openings 320 can include a threaded connection (e.g., an NTP thread) that can correspond and mate with the threaded connection on the connection pipes 140. Thus, each watering tray 130 can include and inlet and an outlet formed in the end caps 300 secured to the ends of the watering tray 130.

Alternatively, the connection pipes 140 can connect to the watering trays 130 at other locations. For example, the bottom wall 132 of the watering trays 130 can incorporate one or more openings, which can accept one or more connection pipes 140. Thus, in one or more implementations, the occupant can fill the watering system 120 with water, wait until the water delivery system 150 absorbs and/or delivers the water into the planters 110, and drain the entire watering system 120, except for the water that can remain within the water delivery system 150. Accordingly, such configuration can reduce the amount of stagnant water in the system and potential for bacterial and fungal growth.

The connection pipes 140 can comprise one or more connectors 330 and one or more conduits 340. The connectors 330 can incorporate threads that can match the threads incorporated in the openings 320. Thus, the installer can screw the connectors 330 into the openings 320, thereby creating a sealed connection between the connection pipes 140 and the opening 320 (and consequently, the watering trays 130).

The connectors 330 can have various configurations. For example, the connectors 330 can include a threaded portion and a straight portion. The threaded portion, as described above, can screw into the end cap 280. The straight portion can accommodate an appropriate conduit 340. For instance, the straight portion can include barbs, which can help to secure the conduit 340 to the connector 330. Furthermore, the connectors 330 can have various shapes. In at least one implementation, the connectors 330 can have 90° angle formed between the threaded and the straight portions thereof. Alternatively, the angle formed between the threaded and the straight portions of the connectors 330 can be substantially 180°, acute, or obtuse.

The connection pipes 140 also can incorporate various types of conduits 340. For example, the conduits 340 can comprise rigid plastic, such as PVC pipes, and can glue or weld to the connectors 330. Alternatively, the manufacturer or installer can use the conduits 340 made from a flexible material, such as rubber or another elastomeric material; in other words, one or more of the conduits 340 can comprise a hose.

In at least one implementation, the occupant can manually deliver the water into the watering system 120. Alternatively, the watering system 120 can incorporate automated or semi-automated water delivery. For example, the watering system 120 can incorporate or connect to a water supply system 350. In particular, the water supply system 350 can connect to the watering trays 130; for instance, the water supply system 350 can connect to the opening 320 in the end cap 280, which connects to the watering tray 130. Thus, the water supply system 350 can supply water into the watering trays 130.

In one or more implementations, the water supply system 350 includes one or more connectors 330 and one or more conduits 340. Additionally, the water supply system 350 includes a water source. For instance, the water source can be the building's plumbing system. The water supply system 350 also can include a valve. The valve can be manually operable or automated. Thus, the occupant of the building can open the valve to fill the watering system 120 with water and can close the valve once sufficient amount of water has been added to the watering system 120. Alternatively, a controller also can open and close the valve, which can occur based on predetermined parameters, such as time, water level within the watering system 120, air temperature, etc.

Once filled, the water can remain in the watering trays 130 of the watering system 120 until absorbed by the water delivery system 150, delivered into the planters 110, and/or until evaporated. Alternatively, the watering system 120 can include or connect to a drainage system 360. In particular, the drainage system 360 can connect to the opening 320 in the end cap 280 (e.g., in the end cap 280b). For example, the drainage system 360 can include one or more conduits 340 and one or more connectors 330, which can connect to the opening 320.

Thus, the drainage system 360, for example, can channel the water out of the watering trays 130. The drained water can subsequently flow into a sewer system of the building. Additionally or alternatively, the watering system 120 can include an overflow prevention mechanism, which can prevent overflow of water in the watering trays 130 when the water reaches a predetermined level. In particular, once the water level reaches the opening 320, the water can flow out of the watering trays 130 and into the drainage system 360.

The drainage system 360 also can include one or more valves to control the outflow of water from the watering system 120. Similar to the water supply system 350, the drainage system 360 also can have manual or automated operation. In at least one implementation, the occupant of the building can open and/or close the valves of the drainage system 360, thereby allowing the water to flow out of the watering system 120. Alternatively, a controller can open and/or close the valves of the drainage system 360 based on various parameters, such water level within the watering trays 130, water flow rate into the watering system 120, etc. Furthermore, the controller of the drainage system 360 can operate in coordination or can integrate with the controller of the water supply system 350, such that the inflow and outflow of water into and out of the watering system 120, respectively, can occur based on predetermined settings.

Additionally, as described above, the watering system 120 can have a single fill point, such that the water can enter the watering system 120 at one location and flow into all of the watering trays 130 of the watering system 120. For instance, the watering tray 130 within the watering system 120 can interconnect with one or more connection pipes 140, such that the water can flow from one watering trays 130 into another watering trays 130. In particular, gravity may force the water to flow from a higher watering tray 130 to a lower watering tray 130—e.g., from the watering tray 130a to the watering tray 130b. Accordingly, when the watering tray 130a fills with water such that the water level reaches the opening 320, the water can flow from the watering tray 130a, through the opening 320, through the connection pipes 140, and into the watering tray 130b.

Similarly, the water can drain out of the watering system 120 at a single point (drainage point). For example, the drainage point can locate at the lowest watering tray 130 in the watering system 120—e.g., the watering tray 130c can connect to the drainage system 360. Thus, the water can flow from the watering trays 130 that are higher than the lowest watering tray 130, and out of the drainage point into the drainage system 360. Moreover, watering trays 130 located at the same altitude can connect with connection pipes 140, such that the water from one watering tray 130 can enter another watering tray 130 and can exit through the drainage point.

Accordingly, the watering system 120 can include a single fill point and a single drainage point. This can simplify filling and maintenance of the watering system 120 and, subsequently, of the indoor live plant system 100. More specifically, the live plants within the system can receive water by filling the watering system 120 at a single point and allowing the water to either remain in the watering trays 130 or drain out of the watering trays 130. Hence, the occupant may avoid watering individual live plants, planters 110, and/or watering trays 130.

Figure 4:
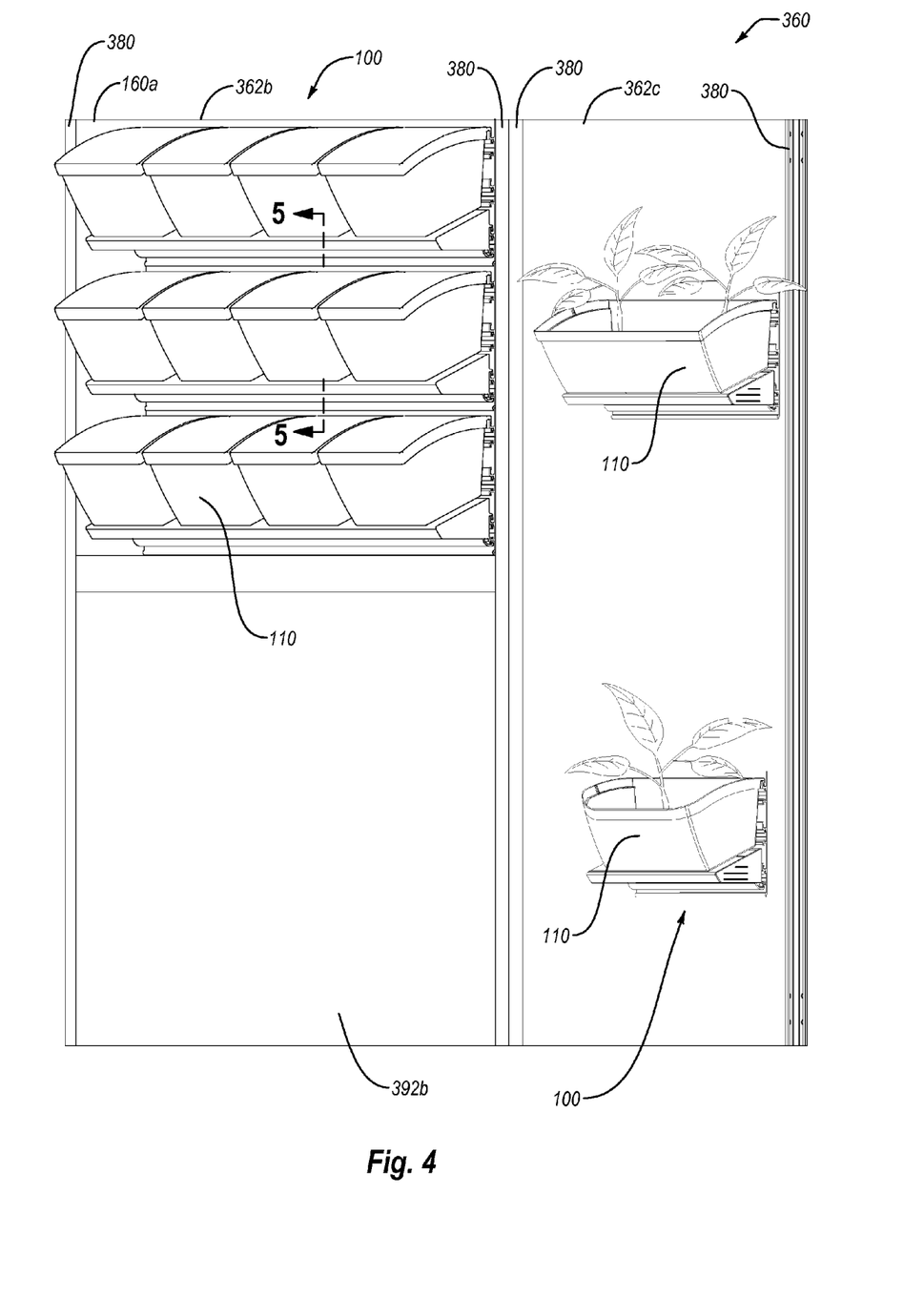
FIG. 4 illustrates a perspective view of two wall modules each incorporating an indoor live plant system in accordance with one implementation of the present invention.

As described above, the live plant system 100 can couple to or integrate with a wall module of a modular wall system. For example, FIG. 4 illustrates a reconfigurable modular wall system 360 comprising a plurality of wall modules 362b, 362c. The wall modules 362b, 362c can include one or more live plant systems 100. Accordingly, one wall modules incorporating live plants 362b, 362c can couple to one or more other wall modules, thereby forming a reconfigurable modular wall system. The reconfigurable modular wall system can incorporate any number of wall modules incorporating live plant systems or wall modules including no live plant systems.

The installer can couple and decouple the wall modules and/or the wall module incorporating live plant systems using connectors. Accordingly, the installer can move and rearrange, thereby forming reconfigurable modular wall system incorporating one or more live plant systems 100 that can have any shapes, size, and/or configuration desired by the installer. After rearranging the wall modules and/or wall modules 362b, 362c incorporating live plant systems 100 into a new configuration, the installer, for instance, can reconnect the water supply system 350 and drainage system 360 to the plumbing and sewer systems of the building, respectively. In one or more implementations, the installer can use flexible connectors (e.g., hoses) to make such connections.

Furthermore, the installer can use one or more reconfigurable modular wall systems incorporating one or more live plant systems 100 to form individual spaces of various shapes, sizes, and configurations. In particular, the installer can arrange the reconfigurable modular wall system incorporating one or more live plant systems 100 to form one or more individual spaces (e.g., offices, hallways, cubicles, rooms, etc.) of desired shapes and sizes. In at least one implementation, the reconfigurable modular wall system incorporating one or more live plant systems 100 can incorporate live plants on both sides thereof. Alternatively, the reconfigurable modular wall system 360 incorporating one or more live plant systems 100 can have live plants on a single side.

As illustrated in FIG. 4, a design or user can mount of various sizes and configurations of indoor live plant systems 100 to the wall modules 362b, 362c. Furthermore, in at least one implementation, the installer can conceal at least a portion of the watering system 120 within the wall module 362b, 362c. For example, the connection pipes 140, water supply system 350, and/or drainage system 360 can couple to the panel 160a on an inner portion of the panel 160a. In other words, the connection pipes 140, water supply system 350, and drainage system 360 can be concealed within the wall module 362b. Such concealment can further increase the aesthetic of the indoor live plant system 100 as well as of the wall module incorporating live plants.

As shown by FIG. 4, the live plant systems 100 can comprise an array of planters 110 (e.g., 12 planters 110). Alternatively, the live plant systems 100 can comprise a single row or single planter 110. Thus, one will appreciate that the system of the present invention can allow a designer/builder to incorporate any number, size, or arrangement of planters 110 to provide a desired aesthetic.

Figure 5:
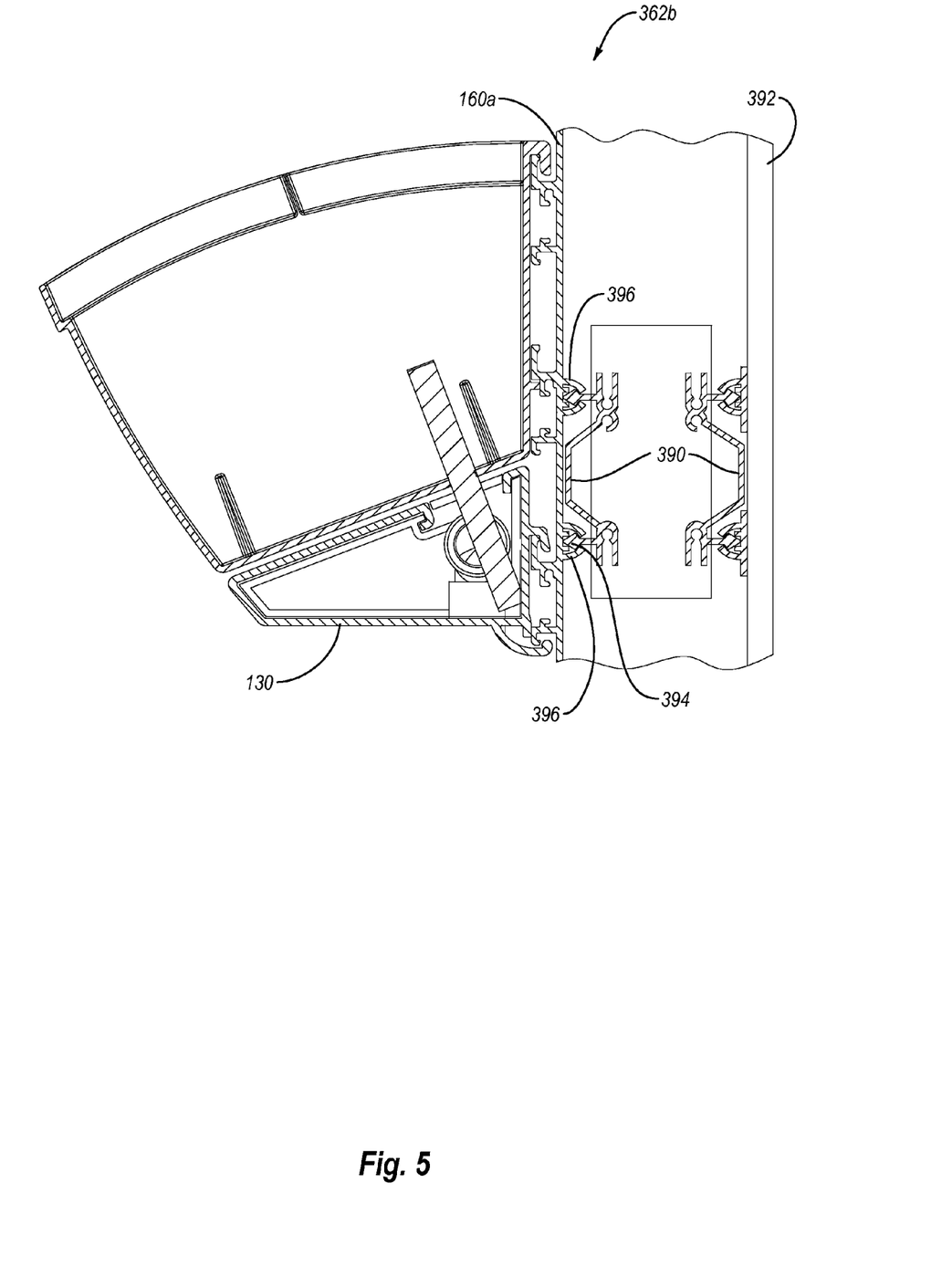
FIG. 5 illustrates a cross-sectional view of a portion of the indoor live plant system of FIG. 4 taken along the line 5-5 of FIG. 4.

FIG. 5 illustrates a cross-sectional view of the wall module 362b of FIG. 4. As shown by FIG. 5, the wall module 362b can comprise a frame formed by one or more upright supports 380 (FIG. 4) and one or more cross-members 390. The cross-members 390 can couple to an upright support 380 on each side of the wall module 362b. The upright supports 380 in turn can couple to upright supports of adjacent wall modules (362c) to form a wall etc. The frame of the wall module 362b can provide the support and structure for attaching one or more panels 160a, 392.

As shown by FIG. 5, in one or more implementations the panel 160a can couple directly to the cross-members 390 of the wall module 362b. In particular, each cross-member 390 can include an engagement protrusion 394. In one or more implementations, the engagement protrusion 394 comprises an arm with a head attached to the end. For example, FIG. 5 illustrates an arrow-shaped head. The panel 160a can in turn include clips 396 including flexible arms that clip or snap about the head of engagement protrusions 394 to secure the panel 160a (and associated indoor live plant system 100) to the wall module 362b. In particular, the flexible arms of the clip 396 can surround at least a portion of the head of the engagement protrusion 394.

The ability to clip the panel 160a to a frame of a wall module 362b can allow a user to selectively remove, move, or reconfigure the position of an indoor live plant system 100 within a given modular wall system. For example, referring again to FIG. 4, a user could decide to switch panels 160a and 392b of wall module 362b to reposition the indoor live plant system 100 from the top of wall module 362b to the bottom. Similarly, a user could move panel 160a and the associated indoor live plant system 100 to wall module 362c. One will thus appreciate that the ability of the panel 160a to selectively couple to the frame of a wall module can provide a designer with the ability to move or reconfigure a design space without having to dissemble the indoor live plant system 100.

In alternative implementations, the panel of the indoor live plant system 100 may not include clips 396. In such implementations, a user can fasten the panel 160 (FIG. 2) directly to a wall module panel 392 (FIG. 5) via screws or other fasteners. One will appreciate that such implementations can allow a user to retro fit a given wall module with an indoor live plant system 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A wall module incorporating live plants, the wall module being configured to selectively attach to one or more additional wall modules to form a reconfigurable partition to divide an interior space, the wall module comprising:
   one or more upright supports configured to couple the wall module to another wall module;
   one or more cross-members secured to the one or more upright supports;
   a panel comprising an outer surface, the panel configured to be coupled to one or more of the one or more upright supports and the one or more cross-members;
   one or more planters each having a front wall, an opposing rear wall, and a bottom wall, wherein the rear wall abuts the outer surface of the panel such that an interior surface of the bottom wall forms an obtuse angle with the outer surface of the panel when the rear wall abuts the panel, the rear wall being disposed between the interior surface of the bottom wall and the outer surface of the panel such that the rear wall is disposed within the obtuse angle, each rear wall comprising one or more mounting elements that are removably secured to the panel, the one or more planters being sized and configured to define an interior for containing one or more live plants; and
   a watering system configured to supply water to the one or more planters, the watering system comprising one or more watering trays disposed below the one or more planters, each of the one or more watering trays having a rear wall, a bottom wall, and a top wall, wherein an outer surface of the top wall forms an obtuse angle with the outer surface of the panel when the rear wall of each of the one or more watering trays abuts the outer surface of the panel, such that the top wall of each of the one or more watering trays and the bottom wall of each of the one or more planters are parallel to one another and extend away from the panel at an obtuse angle.

2. The wall module as recited in claim 1, wherein the watering system comprises one or more connection pipes.

3. The wall module as recited in claim 2, wherein the watering system is configured to receive water at a single point and further configured to distribute the water throughout the watering system.

4. The wall module as recited in claim 1, wherein the watering system further comprises a wick formed from a porous material configured to transport water from the one or more watering trays to the one or more planters by capillary action.

5. The wall module as recited in claim 1, wherein each of the one or more planters is removably secured substantially parallel to the panel by detaching the rear wall of each of the one or more planters from the outer surface of the panel.

6. The wall module as recited in claim 5, wherein the one or more mounting elements comprise:
   one or more mounting hooks on the one or more planters; and
   one or more mounting channels on the panel configured to couple with the one or more mounting hooks of the one or more planters.

7. The wall module as recited in claim 6, wherein the one or more watering trays are removably secured to the panel and comprise the one or more mounting hooks, the one or more mounting hooks configured to fit into the one or more mounting channels of the panel.

8. The wall module as recited in claim 1, wherein the panel comprises one or more clips secured to a back side thereof, the one or more clips being configured to couple directly to the one or more cross-members.

9. The wall module as recited in claim 1, further comprising a plurality of spaced apart supports in each of the one or more planters, each of the plurality of spaced apart supports having a first end and a second end, the first end beginning at and extending generally upward from the interior surface of the bottom wall of each of the one or more planters and the second end extending into the interior of the one or more planters, the plurality of spaced apart supports configured to provide structural support to the one or more live plants.

* * * * *